3,032,593
PREPARATION OF ETHANE TRIS-SULFIDES FROM DISULFIDES AND VINYL SULFIDES
Henry J. Schneider, Hatboro, Pa., assignor to Rohm & Haas Company, Philadelphia, Pa., a corporation of Delaware
No Drawing. Filed Aug. 1, 1960, Ser. No. 46,359
3 Claims. (Cl. 260—609)

This invention relates to a method for preparing ethane tris-sulfides.

More particularly, it is concerned with the preparation of such compounds by an addition reaction of disulfides and vinyl sulfides.

My process involves the reaction of n-alkyl vinyl sulfides with n-alkyl disulfides in the presence of catalytic amounts of iodine, namely about 1 to about 5% by weight of the vinyl sulfide. This addition to form ethane tris-sulfides proved to be quite surprising, as the prior art teachings normally would lead one skilled in the art to expect that iodine would form a complex with the sulfur and thus lose its catalytic activity. Were this to be the case it would be impossible for the disulfide to be added to the vinyl sulfide at the latter's olefinic center. Nevertheless, the accomplishment of such addition is precisely what is done by the present invention.

The invention may be illustrated by the following typical reaction:

(1)
$$CH_2=CHSR + RSSR \xrightarrow{I_2}$$
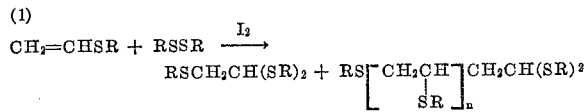

in which R is a lower alkyl ($C_1$ to $C_8$) group.

That this reaction was surprising may be illustrated by the fact that although the addition takes place when one hetero-atom, sulfur, is present, it would not take place to any substantial extent when other hetero-atoms, such as oxygen or nitrogen, were present. This was demonstrated by numerous failures to react vinyl amides with disulfides, and the very slight conversions obtained when vinyl ethers were reacted with disulfides, both in the presence of iodine. Apparently, the complex formed between hetero-atoms other than sulfur is so strong that the iodine is tied up to the point where it is no longer present in its elemental form and cannot function as a catalyst. For some unexplained reason the tendency to form such a complex is not so strong in the case of sulfur, and the iodine is available to react with good conversions when vinyl sulfide is the olefin to which the disulfide is added.

Illustrative of the present invention is the example which follows:

EXAMPLE

*Addition of Methyl Disulfide to Methyl Vinyl Sulfide*

(2)
$$CH_3SCH=CH_2 + CH_3SSCH_3 \xrightarrow{I_2}$$
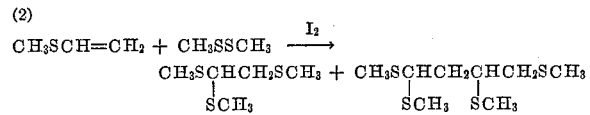

Methyl vinyl sulfide (34.3 g., 0.46 mole) was added dropwise over a one-hour period to a stirred solution of methyl disulfide (43.5 g., 0.46 mole) and iodine (0.8 g.) at room temperature. Stirring was continued for an additional six hours. The reaction mixture was then allowed to stand at room temperature for three days.

The dark reaction mixture was washed with 10% aqueous sodium hydroxide until the iodine color disappeared. The organic layer was separated and distilled through a modified Claisen, and the following products were recovered: 1,1,2-tris(methylthio)ethane (42 g., 0.25 mole, 54.2% of theoretical).

Calc. for $C_5H_{12}S_3$: C, 35.67; H, 7.19; S, 57.14. Found: C, 35.94; H, 7.22; S, 56.99. Butane (17 g., 0.07 mole, 30.3% of theoretical). Calc. for $C_8H_{18}S_4$: C, 39.62; H, 7.48; S, 52.89. Found: C, 39.90; H, 7.71; S, 52.90.

Essentially the same procedure has been successfully employed with alkyl disulfides and alkyl vinyl sulfides in which the alkyl groups ranged as high as butyl in one or in both reactants. Other useful modifications were to employ a coil reactor in which the reactants were added together gradually over an extended period of time, rather than all at once as in the batch process, and to add the vinyl sulfide to a multi-molar excess of the disulfide. Temperature conditions also were varied but their only effect proved to be a hastening of the reaction under elevated conditions.

The ethane tris-sulfides prepared by the present invention have numerous uses, primarily as chemical intermediates for use in various reactions where it is desirable to form carbanions. They are a source for the preparation of high molecular weight polymers of the kind indicated in the typical Reaction 1 set forth above. Another use is in the preparation of ketene mercaptals as illustrated in Equation 3 below. In that reaction the vinyl sulfide acts as a "carrier" and is recycled after regeneration.

(3)
$$CH_2=CHSR + RSSR \xrightarrow{I_2}$$
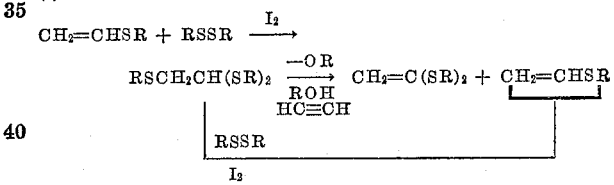

in which R is a lower alkyl ($C_1$–$C_8$) group.

The preparation of ketene mercaptals, together with other α-substituted vinyl sulfides, is disclosed more in detail and claimed in copending application Serial Number 46,358, which was filed on August 1, 1960, simultaneously with the present application. As described in that copending case, the ketene mercaptals contribute to the various polymers formed therefrom the property of thermal oxidative stability, and are useful in textile finishing, leather, paper, and in the coatings art, as well as in additives for fuel and lubricating oils.

I claim:

1. Process for preparing ethane tris-sulfide comprising the reaction of an n-alkyl vinyl sulfide having the formula $CH_2=CHSR$ with an n-alkyl disulfide having the formula RSSR in the presence of a catalytic amount of iodine, the R in both compounds being an alkyl group having from 1 to 8 carbon atoms.

2. Process of claim 1 in which the iodine is present in an amount which constitutes from about 1 to about 5% by weight of the vinyl sulfide.

3. Process in claim 1 in which the R in both compounds is a methyl group.

No references cited.